US012720647B2

(12) United States Patent
Xu et al.

(10) Patent No.: US 12,720,647 B2
(45) Date of Patent: Aug. 25, 2026

(54) METHOD FOR CONTROLLING THE PROVISION OF ELECTRIC POWER TO AN INDUCTION COIL

(71) Applicant: ELECTROLUX APPLIANCES AKTIEBOLAG, Stockholm (SE)

(72) Inventors: Chunlong Xu, Shanghai (CN); Alex Viroli, Forli (IT); Massimo Nostro, Forli (IT); Massimo Zangoli, Forli (IT)

(73) Assignee: ELECTROLUX APPLIANCES AKTIEBOLAG, Stockholm (SE)

( * ) Notice: Subject to any disclaimer, the term of this patent is extended or adjusted under 35 U.S.C. 154(b) by 1162 days.

(21) Appl. No.: 17/625,926

(22) PCT Filed: Jul. 15, 2020

(86) PCT No.: PCT/EP2020/070067

§ 371 (c)(1),
(2) Date: Jan. 10, 2022

(87) PCT Pub. No.: WO2021/013661

PCT Pub. Date: Jan. 28, 2021

(65) Prior Publication Data

US 2022/0248505 A1 Aug. 4, 2022

(30) Foreign Application Priority Data

Jul. 19, 2019 (EP) .................................... 19187195

(51) Int. Cl.
*H05B 6/06* (2006.01)
*H05B 6/12* (2006.01)

(52) U.S. Cl.
CPC ........... *H05B 6/062* (2013.01); *H05B 6/1245* (2013.01)

(58) Field of Classification Search
CPC ....... H05B 6/1245; H05B 6/062; Y02B 40/00
See application file for complete search history.

(56) References Cited

U.S. PATENT DOCUMENTS

2008/0203087 A1* 8/2008 Schilling ................ H05B 6/062 219/600

FOREIGN PATENT DOCUMENTS

| | | |
|---|---|---|
| CN | 106160534 | 2/2019 |
| JP | S6313294 | 1/1988 |

OTHER PUBLICATIONS

International Search Report and Written Opinion for PCT/EP2020/070067, dated Sep. 30, 2020, 11 pages.

* cited by examiner

*Primary Examiner* — Elizabeth M Kerr
*Assistant Examiner* — Kuangyue Chen
(74) *Attorney, Agent, or Firm* — Chrisman Gallo Tochtrop LLC

(57) ABSTRACT

The invention relates to a method for controlling the provision of electric power to an inductive element, in particular an induction coil (L), of an induction cooking appliance (1), the induction cooking appliance (1) comprising a circuitry (10) with an input (11), at least one switching element (S) for providing pulsed electric power to the inductive element, in particular the induction coil (L) and a capacitive element, in particular a capacitor (C) being connected in parallel, in particular in series, to the switching element (S), the method comprising the steps of: —receiving rectified AC-voltage ($V_{in}$) at the input (11) of the circuitry (10); —discharging, in particular during a first section/phase (P1), the capacitive element, in particular the capacitor (C) in order to reduce the voltage provided to the switching element (S), in particular during a first period of rectified AC-voltage ($V_{in}$); —after at least partially discharging the capacitive element, in particular the capacitor (C), starting, in particular as a second section/phase (P2), a switching operation of the switching element (S), in particular during a second period of rectified AC-voltage ($V_{in}$); —stopping the switching operation after (Continued)

a switching operation time, in particular during the second period of rectified AC-voltage ($V_{in}$); —iterating the steps of discharging of capacitor (C), starting of switching operation and stopping of switching operation, in particular immediately subsequently, in subsequent periods of rectified AC-voltage ($V_{in}$).

19 Claims, 2 Drawing Sheets

METHOD FOR CONTROLLING THE PROVISION OF ELECTRIC POWER TO AN INDUCTION COIL

The present invention relates generally to the field of cooking appliances. More specifically, the present invention relates to a method for controlling the provision of electric power to an induction coil of an induction hob and a corresponding system.

BACKGROUND OF THE INVENTION

Induction cooking appliances comprising switched heating power transferring elements are known in prior art.

In order to control the provision of heating power to a cookware item, the power level can be varied. Induction generators, specifically induction generators with quasi-resonant architecture often suffer from a limited capability of power variation.

Disadvantageously, at low power level, switching losses occurring at the switching element increase because voltage applied to the switching element at the point of time of switching increases. Said increase of voltage leads to hard switching conditions which rise power dissipation due to thermal losses. In addition, said increase of voltage leads to acoustic noise when performing switching operation. Said problem increases when reducing minimum power level. Therefore, the range in which power level can be chosen is limited downwardly due to thermal losses of the switching element.

SUMMARY OF THE INVENTION

It is an objective of the embodiments of the invention to provide an induction cooking appliance which enables a broad power control range with reduced power dissipation and/or reduced acoustic noise. If not explicitly indicated otherwise, embodiments of the invention can be freely combined with each other.

It is known in the art that such household cooking hobs or cooking appliances usually are provided for conducting at least one cooking process comprising heating and/or cooling step, respectively. Such cooking process preferably at least comprises a heating step, e.g. frying, boiling, simmering or pouching of a foodstuff or a cooking liquid, respectively. For supporting the foodstuff or cookware item, it is particularly known to provide a cooking support, for example in the form of a cooking surface. Such cooking surface usually provides a support for the cookware items, for example, provided in the form of a plate element, particularly a glass or glass ceramic plate.

Preferably, the cooking hob comprises, preferably consists of, a cooking support and a lower casing. Thereby it is preferred that an open top side of the lower casing is covered by at least a part of the cooking support. The cooking support may be provided particularly as at least one panel, wherein preferably the panel is a glass ceramic panel. Preferably, at least one or more heating power transferring elements are arranged beneath the panel.

The lower casing may be manufactured from different material comprising plastics or metal, e.g. aluminum.

In particular, such casing may include a bottom wall and at least one sidewall. It is preferred that said casing is made of metal, e.g. aluminium or steel, and/or plastics, wherein preferably the casing made of metal is grounded.

Advantageously said lower casing may comprise at least one heating power energy unit, particularly arranged in a respective heating power energy unit housing, the heating power transferring elements, heating power transferring element carrier or heating power transferring element support. In other words, the lower casing and the cooking support may form a closed unit comprising all essential parts of the cooking hob. Thereby the lower casing may comprise fastening means for fastening and/or arranging the cooking hob on top of or in a cutout of a work plate.

Thereby, preferably, a power transferring element may be arranged below a cooking support. Preferably, the one or more heating power transferring elements are arranged in an upper portion of the lower casing of the cooking hob. A power transferring element may be arranged and supported by one or more heating power transferring element carrier or heating power transferring element support, preferably the power transferring element attached and/or arranged on said carrier or support. A housing comprising an energy power unit may be arranged below one or more heating power transferring element carrier or heating power transferring element supports. Thereby, preferably a heating power transferring element carrier or heating power transferring element support with the supported heating power-transferring element may advantageously be arranged on top of and/or attached to such housing of an energy power unit.

For conducting the cooking process, particularly a heating step, a cooking appliance, particularly the lower casing, comprises at least one heating power-transferring element. Said heating power-transferring element is provided for transferring heating power to the foodstuff or cooking liquid, preferably contained in a cookware item.

Preferably, the at least one heating power transferring element is an electric heating element, in particular an induction heating element, particularly induction coil, and/or radiant heating element. The heating power provided by a heating power-transferring element may be preferably provided electrically. Preferably, the heating power may be provided by a heat-generating magnetic field, more particularly an induction field. Accordingly, the cooking hob of the present invention preferably is an induction hob.

Preferably, a heating power-transferring element in the form of an induction coil comprises a planar conductive winding wire, particularly a copper wire. Preferably, an induction coil comprises at least one magnetic field supporting element, e.g. a ferrite element. Preferably, said at least one magnetic field supporting element, particularly at least one ferrite element, is arranged below the plane of the conductive winding wire. Said at least one magnetic field supporting element, particularly ferrite element, is advantageous in establishing and/or supporting the high frequent alternating magnetic field of the induction coil. Said magnetic field supporting element, particularly if arranged below the conductive winding wire, may be glued to or supported by ferrite support elements, e.g. snap fit connectors or the like.

Preferably, an induction coil comprises a shielding element, e.g. a mica sheet. The shielding element preferably is adapted to the form of the planar conductive winding wire or the form of at least two planar conductive winding wires of at least two adjacently arranged coils. The shielding element preferably is provided above the at least one magnetic field supporting element, particularly at least one ferrite element. The shielding element preferably in its main function is a support for the planar conductive wire windings of the coil. However, additionally the shielding element, particularly mica sheet, may also shield temperature radiated from the above, e.g. resulting from a heated up pot bottom.

In the cooking hob of the present invention the at least one heating power transferring element is preferably arranged and/or mounted on a heating power transferring element carrier or heating power transferring element support, particularly comprised in the lower casing. It is particularly preferred that a carrier made of aluminum sheet metal supports the heating power-transferring element. Particularly, the cooking hob of the present invention may comprise power transferring element carrier or heating power transferring element support to support one heating power transferring element, however, it is also considered herein that one power transferring element carrier or heating power transferring element support is provided to support more than one heating power transferring element.

In a preferred embodiment of the present invention, two heating power transferring elements are arranged on and supported by one common heating power transferring element carrier. Particularly at least two induction coils are arranged on and supported by one common induction coil carrier plate.

The heating power transferring element carrier or heating power transferring element support may be advantageously supported by or on a housing of the heating energy power unit.

Particularly, at least one of, preferably all of, the heating power transferring elements of an cooking hob of the invention, more particularly an induction coil of an induction hob, may be arranged below a cooking support, particularly a cooking surface in form of a plate element, and particularly within the lower casing, in order to provide the heat for a heating step to a heating zone of the cooking support and to the bottom side of a cookware item and foodstuff, respectively, when placed on said heating zone.

A cooking support of a cooking hob of the invention, particularly of an induction hob of the invention, preferably comprises at least one heating zone. Such heating zone as referred to herein, preferably refers to a portion of the cooking support, particularly cooking surface, which is associated with one heating power transferring element, e.g. a radiant heating element or an induction coil, which is arranged at, preferably below, the cooking support, e.g. the glass ceramic plate. Particularly, in an embodiment according to which the cooking hob of the present invention is an induction hob, it is preferred that such heating zone refers to a portion of the cooking support, which is associated with at least one induction coil. Thereby, the heating power transferring elements associated with a heating zone are preferably configured such that the same heating power of the associated heating power transferring elements is transferred to the heating zone. Preferably, the heating zone thus refers to a portion of the cooking support to which the same heating power of the associated at least one heating power transferring element is transferred.

In addition, the cooking hob of the present invention, may particularly be configured such that in one operation mode one or more than one heating zones form one cooking zone and/or are combined to one cooking zone, respectively. A cooking zone may be particularly provided as at least a portion of the cooking surface. Particularly, such cooking zone is associated with at least one heating zone. Additionally, or alternatively, a cooking zone may be associated with more than one heating zone. Particularly, a cooking zone may be associated with an even number, particularly two, four, six, eight or ten, more particularly two, heating zones. Alternatively, a cooking zone may be associated with an uneven number, particularly three, five, seven or nine, more particularly three, heating zones.

Preferably, the cooking hob of the present invention is configured such that a cooking zone comprises one or more than one heating zones, which can be driven with the same or different power, frequency or heating level.

In the present invention, it is preferred that in at least one operation mode of the cooking hob according to the present invention is configured such that a cooking zone comprises at least two, preferably two, heating zones, driven by the same power, frequency or heating level. Particularly, such cooking zone comprises or is associated with at least two, preferably two, heating power-transferring elements.

Additionally, or alternatively, the cooking hob of the present invention may be configured such that the number of heating zones associated with one cooking zone may vary and/or may be adjustable dependent on the needs of the cook and/or the size, form or kind of cookware placed on the cooking surface.

Particularly, a cooking hob according to the present invention, preferably an electric hob, such as an induction hob, may comprise at least one heating power energy unit. A heating power energy unit as used herein, preferably provides energy to at least one of, preferable a number of, the heating power transferring elements such that the heating power transferring element is capable of transferring heating power for heating up the foodstuff or cooking liquid. A heating power energy unit of an induction hob, for example, may provide energy in the form of a high frequency alternating current to a heating power-transferring element in the form of an induction coil, which transfers heating power in the form of a magnetic field to a suitable cookware item. For such purpose, a heating power energy unit may comprise at least one associated power circuit mounted and/or arranged on at least one printed circuit board. Preferably, a heating power energy unit is supported and arranged in a housing, preferably a plastic housing, preferably arrangable in and adapted to the lower casing. This allows easy manufacturing and modularization.

Particularly, the housing may comprise supporting elements for supporting the heating power transferring element carrier or heating power transferring element support. Particularly, such supporting elements may comprise elastic means, e.g. springs or silicon elements, for elastically supporting the heating power transferring element carrier or heating power transferring element support, and particularly advantageous in pressing a heating power-transferring element onto the bottom surface of the cooking support plate, which particularly is a glass ceramic plate.

Particularly, the heating power energy unit, and particularly the associated power circuit, may be configured to be connected to at least one, preferably two phases of a mains supply. A cooking hob according to the present invention thereby comprises at least one, preferably two or three heating power energy units, connected to one or two, preferably one phases of the mains supply each.

Preferably, a heating power energy unit may comprise at least—one associated power circuit, particularly in the form of an at least one heating power generator, for generating heating power and supplying heating power-transferring elements with heating power, particularly for providing heating power to the at least one heating zone. Thereby the power circuit particularly may be provided in the form of a half-bridge configuration or a quasi-resonant configuration.

It will be immediately understood that the heating power energy unit may thus comprise one heating power generator for providing heating power to more than one heating zone, each associated with at least one heating power transferring element.

Furthermore, the heating power energy unit may comprise one heating power generator comprising a single or pair of high frequency switching elements.

In particular, the high frequency switching element is provided in the form of a semiconductor-switching element, particularly an IGBT element.

In case the heating power energy unit may comprise one heating power generator comprising a single high frequency switching element, the single switching element preferably forms part of associated power circuit, provided in the form of a or a part of a Quasi Resonant circuit.

In case that the heating power energy unit may comprise one heating generator comprises a pair of high frequency switching elements, said pair of high frequency switching elements preferably forms part of an associated power circuit, provided in the form of a or a part of a half-bridge circuit.

A person skilled in the art will immediately understand that the heat, generated by and/or radiated from particularly the heating power transferring elements, the heating power energy unit and/or the cookware item, particularly the bottom thereof, may have also disadvantageous effects, particularly regarding safety and proper functioning. Particularly, the heating power energy unit, more particularly power circuits comprising switching elements, may generate a significant amount of heat being disadvantage for the safety and proper functioning of the cooking hob. For this reason, the cooking hob comprises at least one cooling means. Particularly, said cooling means is adapted for cooling down the electric and/or electronic elements. Particularly, the heating power energy unit may comprise such cooling means. Such cooling means may comprise at least one of a fan, a cooling channel, a cooling body, preferably from a metal, particularly aluminium, cooling air-guiding means, cooling air deflection means and the like. Particularly, the cooking hob of the present invention may comprise such cooling means for cooling at least one heating power generator or a part thereof, particularly to at least one single or pair of high frequency switching elements. More particularly, such cooling means may comprise a cooling body, preferably arranged in the air path of a cooling fan, and thermally connected to at least one heating power generator or a part thereof, particularly to at least one single or pair of high frequency switching elements. Thereby it is preferred that the cooling means comprises at least one fan for generating an air stream through the cooling channel. Preferably, the cooling channel and/or cooling body extends horizontally through the cooking hob. For example, the cooling channel and/or cooling body extends over a substantial part of the horizontal width of the cooking hob.

The cooking hob according to the present invention preferably further comprises a control unit. Such control unit is preferably operatively connected with the heating power energy unit to control at least one operational parameter of the cooking hob, particularly an operational parameter of the heating power energy unit. Furthermore, the control unit comprises a user interface at least for receiving a command input of a user. This advantageously allows the user to control at least one operational parameter of the cooking hob, particularly an operational parameter of the heating power energy unit. Moreover, the control unit, and particularly a user interface if present, may be operatively connected to other appliances or interfaces, e.g. a suction hood, a voice control device, a server, a remote interface, a cloud-computing source or the like.

Accordingly, the household cooking hob according to the present invention comprises at least one electric and/or electronic element. Particularly, said at least one electric and/or electronic element comprises a heating power energy unit and/or control unit or parts thereof.

Particularly, the at least one electric and/or electronic element of the household cooking hob of the present invention may be part of an at least one heating energy power unit, preferably mounted and/or arranged on a power board and/or a power generating circuit mounted on a printed circuit board (PCB).

Such at least one electric and/or electronic element may be, for example, selected from the group comprising a heating power generator, filter coils, EMC filters, rectifier, switching elements, like IGBTs, relays, or the like.

According to an aspect, the invention refers to a method for controlling the provision of electric power to an induction coil of an induction cooking appliance. The induction cooking appliance comprises a circuitry with an input, at least one switching element for providing pulsed electric power to the induction coil and a capacitor being connected in parallel to the switching element. The method comprises the steps of:

- receiving rectified AC-voltage at the input of the circuitry;
- discharging the capacitor in order to reduce the voltage provided to the switching element;
- after at least partially discharging the capacitor, starting a switching operation of the switching element;
- stopping the switching operation after a switching operation time; and
- iterating the steps of discharging of capacitor, starting of switching operation and stopping of switching operation in subsequent periods of rectified AC-voltage.

By the method according to the invention, in particular, the variation of the electric power of the induction cooking appliance is or at least can be below a predetermined range, more in particular below 20%, more in particular below 10%.

By the method according to the invention, in particular, the variation of the electric power of the induction cooking appliance within a period of rectified AC-voltage is or at least can be below a predetermined range, more in particular below 20%, more in particular below 10%.

In particular, each of the steps of starting of switching operation, stopping of switching operation and discharging of the capacitor is or can be iterated during each period of rectified AC-voltage.

In particular, the capacitor is or can be loaded to its maximum voltage in a third section or phase, more in particular during the second period of rectified AC-voltage.

According to an aspect, the invention refers to a method for controlling the provision of electric power to an inductive element, in particular an induction coil, of an induction cooking appliance, preferably in at least one operating mode. The induction cooking appliance comprises a circuitry with an input, at least one switching element for providing pulsed electric power to the inductive element, in particular the induction coil and a capacitive element, in particular a capacitor being connected in parallel, in particular in series, to the switching element. The method comprising the steps of:

- receiving rectified AC-voltage at the input of the circuitry;
- discharging, in particular during a first section/phase, the capacitive element, in particular the capacitor in order to reduce the voltage provided to the switching element, in particular during a first period of rectified AC-voltage;
- after at least partially discharging the capacitive element, in particular the capacitor, starting, in particular as a second section/phase, a switching operation of the switching element, in particular during a second period of rectified AC-voltage;

stopping the switching operation after a switching operation time, in particular during the second period of rectified AC-voltage;

in particular, loading the capacitor to its maximum voltage in a third section/phase, more in particular during the second period of rectified AC-voltage, iterating the steps of discharging of capacitor, starting of switching operation and stopping of switching operation, in particular immediately subsequently, in subsequent periods of rectified AC-voltage, in particular iterating each of the steps of starting of switching operation, stopping of switching operation and discharging of capacitor during each period of rectified AC-voltage, so that, in particular, the variation of the electric power is or can be below a predetermined range.

Especially, each of the three sections or phases are performed subsequently during each period of rectified AC-voltage.

In particular, the AC-voltage can be a sinusoidal AC-voltage having a frequency of 50 Hz, 60 Hz or between 50 Hz and 60 Hz. The rectified AC-voltage correspondingly can be a sequence of essentially positive half sinus waves and/or can have a frequency of 100 Hz to 120 Hz. The rectified AC-voltage can in particular be a sinusoidal AC-voltage which has been rectified by a rectifier, in particular by a bridge rectifier, more in particular by a diode bridge rectifier.

A "period of rectified AC-voltage" can in particular be a single positive half sine wave of the mains input voltage or a phase-shifted positive half sine wave, so that more in particular a period of rectified AC-voltage can comprise a first portion within a first positive half sine wave and a second portion within a second positive half sine wave, preferably with a length of about 10 ms. Those periods can for example be repeated with a frequency of between 100 Hz and 120 Hz.

A phase or section can in particular be a part of a period of rectified AC-voltage. A phase or section can in particular also be a part of a first and/or a second period of rectified AC-voltage.

In particular, the first phase or section can be immediately followed by the second phase or section which can be immediately followed by the third phase or section.

In particular, the sequence constituted by a first phase or section, a second phase or section and a third phase or section can be equal to in terms of time or can have the same duration like a single, more in particular phase shifted, period of rectified AC-voltage.

In particular, a phase can be a synonym for a section.

In particular, the induction coil can be an inductive element.

In particular, the capacitor can be a capacitive element.

In particular, a first period of rectified AC-voltage can be immediately followed by a second period of rectified AC-voltage. In particular, a or the second period of rectified AC-voltage can be directly subsequent to a or the first period of rectified AC-voltage.

In particular embodiments, continuous electric power is or can be provided to a cooking vessel, for example to a pot, arranged on the induction cooking appliance, more in particular from OW or no power to a maximum power, so that the user experience can be improved, in particular considerably.

Continuous electric power means in particular that during each period of rectified AC-voltage, the same or at least essentially the same electric power is provided. Hence, the variation of the electric power is below a predetermined range, in particular below a predetermined maximum variation, in particular below 10% or 5%.

The inductive element, in particular the induction coil, and a capacitive element, in particular a capacitor, in, preferably parallel, combination can also be called a resonant tank. In particular, the induction coil, and a capacitive element, in particular a capacitor, are or can be connected in parallel.

Said method is advantageous because due to the discharging step before starting the switching operation, voltage applied to the switching element is reduced. Thereby, switching-on of switching element at high voltage levels can be avoided which reduces power dissipation due to thermal losses within the switching element and acoustic noise generated due to hard switching conditions.

According to an embodiment, said discharging is started during a period of time in which the slope of the rectified AC-voltage is falling. Thereby it is possible to charge the capacitor and perform said switching operation during the rising slope of the rectified AC-voltage.

In particular said discharging is performed by a single switching operation, during which a discharging entity and/or the switching element is preferably gradually, in particular at least essentially linearly, changed from a closed state to an opened state. This can enable a gentle discharging of the capacitive element.

The discharging entity can in particular be configured to enable a discharging of said capacitive element, in particular capacitor. Said discharging entity can be connected in parallel to the capacitor.

According to an embodiment, the capacitor is discharged to a voltage of 50V or lower. Thereby, the voltage applied to the switching element is reduced and hard-switching condition can be mitigated or avoided which leads to a reduction of power dissipation and a reduction of acoustic noise.

In particular, the voltage of the capacitor can be determined by a measuring unit, more in particular by a measuring unit of or within the discharging entity.

According to an embodiment, said discharging is stopped at or close to zero point of rectified AC-voltage. Thereby, advantageously, the rising slope of rectified AC-voltage can be used for performing said switching operation and for charging the capacitor.

According to an embodiment, said discharging is stopped before zero point of rectified AC-voltage.

In particular, for stopping the discharging, a discharging entity and/or the switching element can be, for example gradually, be switched from a opened state to a closed state.

According to an embodiment, the switching operation is started at or close to zero point of rectified AC-voltage. The term "close to zero point" may be defined as an area around zero point which has a duration of 10% or less, specifically 5% or less than the period of rectified AC-voltage. At said point of time, the voltage provided to the switching element is low and detrimental effects caused by hard-switching condition can be avoided.

In particular, the switching operation can be started before zero point of rectified AC-voltage and/or when the capacitor is discharged to a voltage of 50V or lower, more in particular in response to a measuring signal from a measuring unit of or within the discharging entity. Therefore, preferably, the switching operation can start at an end of the first period of rectified AC-voltage and continue during the second period of rectified AC-voltage, in particular until the rectified AC-voltage exceeds a predetermined value, in particular 50%, 60%, 70% or 80% of its maximum value. Hence, preferably, a smoother operation is possible and/or the thermal losses are reduced, as switching at the maximum voltage is avoided.

In particular, the switching operation can be performed with a switching frequency determined by a first zero crossing detection means ZM (shown schematically in FIG. 2).

In particular, the first zero crossing detection means ZM can detect when the voltage across the switching element is lower than a predetermined value, in particular lower than 10% of the maxi mum value, more in particular at least essentially zero. Such a zero crossing detection means ZM can be advantageous, as the resonance frequency of the inductive element, in particular the in duction coil and the capacitive element, in particular a capacitor, can vary dependent on a cooking vessel arranged on the induction cooking appliance.

In particular, the switching frequency is determined by the resonance frequency of the resonant tank, the resonant tank comprising the inductive and a capacitive element. In particular, the switching frequency is within a range between 25 kHz and 30 kHz.

In particular, the switching operation can be performed with a Ton time determined by a voltage of the inductive element, in particular the induction coil and/or the capacitive element, in particular the capacitor, so that the thermal losses are kept below a predetermined range. In particular, the Ton time is determined such that the switching voltage, more in particular at the end of the Ton time, is less than 50%, more in particular less than 40% of the maximum voltage.

In particular, a switching operation is an operation wherein an at least essentially rectangular drive signal is provided, more in particular as pulsed signal, which signal alternates with a duty cycle between an active state for a Ton time and an inactive state for a Toff time.

The at least essentially rectangular signal can in particular be used for driving the switching element, which in turn provides pulsed electrical power to the inductive and capacitive element, more in particular by opening and closing the switching element in response to the driving signal, which switching element in turn opens and closes a connection of the inductive and capacitive element to a predetermined voltage, in particular to a ground voltage or zero voltage.

Hence, the switching and conduction losses can be lower, as the activation of the switching element, in particular IGBT, and/or the switching operation can be limited to an area, section and/or phase close to or after zero-crossing of rectified AC-voltage and/or or a mains voltage, so that, preferably, the efficiency of the induction cooking appliance is or can be higher or increased.

According to an embodiment, said switching operation is stopped before the rectified AC-voltage reaches its minimum value. So in other words, the switching operation is not performed during the whole period of rectified AC-voltage but only during a time period which is shorter than the period of rectified AC-voltage. In yet other words, said switching operation is performed only during a first section of the period of rectified AC-voltage which is smaller than the entire period of rectified AC-voltage. Thereby, during breaks of switching operation, discharging of capacitor before starting said switching operation and, preferably, also re-charging of said capacitor after stopping said switching operation can be performed.

In particular, said switching operation can be stopped before the rectified AC-voltage reaches 90%, more in particular 80%, more in particular 70%, more in particular 60%, more in particular 50%, of its maximum value.

In particular, said switching element can only be operated during a first section or phase of the period of rectified AC-voltage which is smaller than the entire period of rectified AC-voltage.

In particular, said switching element is not operated, in particular closed, during a second and/or third section/phase of the period of rectified AC-voltage which is smaller than the entire period of rectified AC-voltage.

In particular, the averaged power loss of the switching element is below a predetermined maximum power loss.

In particular, the switching operation time determines the electric power provided to the induction coil and the capacitor.

In particular, the switching operation time is determined in response to a power level of a heating zone. In particular, the switching operation time can be determined in response to a power level of a heating zone, more in particular by means of a open and/or closed loop, so that an electric power corresponding to the power level is provided to the induction coil and the capacitor.

According to an embodiment, said switching operation is stopped before the rectified AC-voltage reaches its maximum value. In other words, switching operation is stopped during the rising slope of rectified AC-voltage. Thereby, it is possible to recharge the capacitor to a maximum voltage value.

According to an embodiment, discharging of the capacitor is performed during a second section of the period of rectified AC-voltage which does not overlap with said first section. So, in other words, switching operation is not performed simultaneously with said capacitor discharging caused by a discharging entity. Thereby, said capacitor discharging has no detrimental effects on said switching operation.

According to an embodiment, during a third section of the period of rectified AC-voltage, a charging of the capacitor is performed, wherein said third section of the period of rectified AC-voltage lies between the first section as a period of time in which switching operation is performed and the second section as a period of time in which capacitor is discharged of a certain period of rectified AC-voltage. So in other words, between each switching operation period and discharging period, a re-charging of capacitor is performed.

In particular, during the third section of the period of rectified AC-voltage, the voltage is or can be at least essentially constant.

In particular embodiments, the third section of the period of rectified AC-voltage starts before 40% of a period of the rectified AC-voltage and ends after 60% of a period of the rectified AC-voltage.

In particular embodiments, the third section of the period of rectified AC-voltage starts and ends when the rectified AC-voltage is at least 20% below its maximum.

According to an embodiment, said discharging and said switching operation is repeated periodically with the periodicity of the rectified AC-voltage. Thereby it is possible to operate the induction cooking appliance at a reduced minimum power level without exceeding a maximum operating temperature of the switching element and without switching pauses greater than the period of rectified AC-voltage.

According to a further aspect, the invention relates to a system for controlling the provision of electric power to an induction coil of an induction hob. The system comprises a circuitry including an input for receiving rectified AC-voltage, at least one switching element for providing pulsed electric power to the induction coil, a capacitor being connected in parallel to the switching element and a discharging entity being configured to enable a discharging of said capacitor. The system further comprises a control entity, wherein the control entity is configured to perform subsequent control cycles, wherein in said control cycle the control entity is configured to discharge said capacitor based on said discharging entity and, after discharging the capacitor, to start a switching operation of the switching element in order to provide pulsed electric power to the induction coil.

According to a further aspect, the invention relates to a system for controlling the provision of electric power to an inductive element, in particular an induction coil of an induction cooking appliance, in particular induction hob, in particular for performing a method as disclosed herein, the system comprising a circuitry including an input for receiving rectified AC-voltage, at least one switching element for providing pulsed electric power to the inductive element, in particular induction coil, a capacitive element, in particular capacitor being connected in parallel to the switching element and a discharging entity being configured to enable a discharging of said capacitive element, in particular capacitor, the system further comprising a control entity, wherein the control entity is configured to perform subsequent control cycles, wherein in said control cycle the control entity is configured to discharge said capacitive element, in particular capacitor based on said discharging entity and, after at least partially discharging the capacitive element, in particular capacitor, to start a switching operation of the switching element in order to provide pulsed electric power to the inductive element, in particular induction coil.

Said system is advantageous because due to discharging the capacitor before starting the switching operation, voltage applied to the switching element is reduced. Thereby, switching-on of switching element at high voltage levels can be avoided which reduces power dissipation due to thermal losses within the switching element and acoustic noise generated due to hard switching conditions.

According to an embodiment of the system, said discharging entity is connected in parallel to the capacitor. Said discharging entity may include a resistor which can be activated and deactivated based on a switching element. In an activated state, the resistor is connected in parallel to the capacitor in order to discharge said capacitor. Thereby a time-selective discharging of capacitor is possible.

According to an embodiment of the system, the control entity is configured to perform the switching operation in a portion of the period of rectified AC-voltage, wherein the portion of the period is smaller than the entire period of rectified AC-voltage. Thereby it is possible to also perform a discharging of capacitor before said switching operation and, preferably, a recharging of capacitor after said switching operation.

According yet another aspect, the invention relates to an induction cooking appliance comprising a system as described before.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
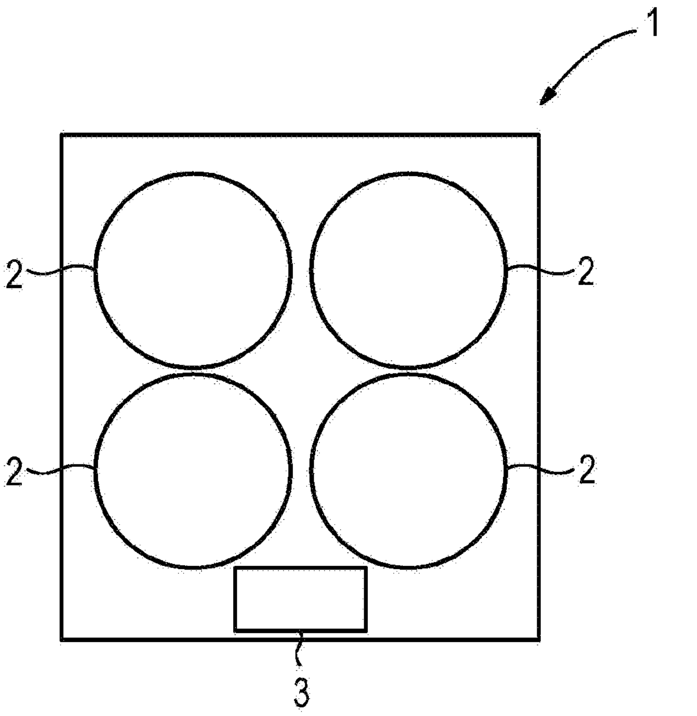
FIG. 1 shows an example top view on a cooking appliance comprising multiple heating zones.

The present invention will now be described more fully with reference to the accompanying drawings, in which example embodiments are shown. The embodiments in the figures may relate to preferred embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein. Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

FIG. 1 illustrates a schematic diagram of an induction cooking appliance 1, in the present example an electric induction hob.

The induction cooking appliance 1 comprises multiple heating zones 2. Each heating zone 2 may be, for example, associated with one or more heating power transferring elements, specifically, one or more induction coils. The induction cooking appliance 1 may be configured to combine two or more heating zones 2 in order to form larger-sized cooking zones.

In addition, the induction cooking appliance 1 comprises a user interface 3, based on which a user may control the induction cooking appliance 1. For example, based on the user interface 3, the user may control the power level of the heating zones 2. The power level may be chosen between a minimum power level $P_{min}$ and a maximum power level $P_{max}$.

Figure 2:
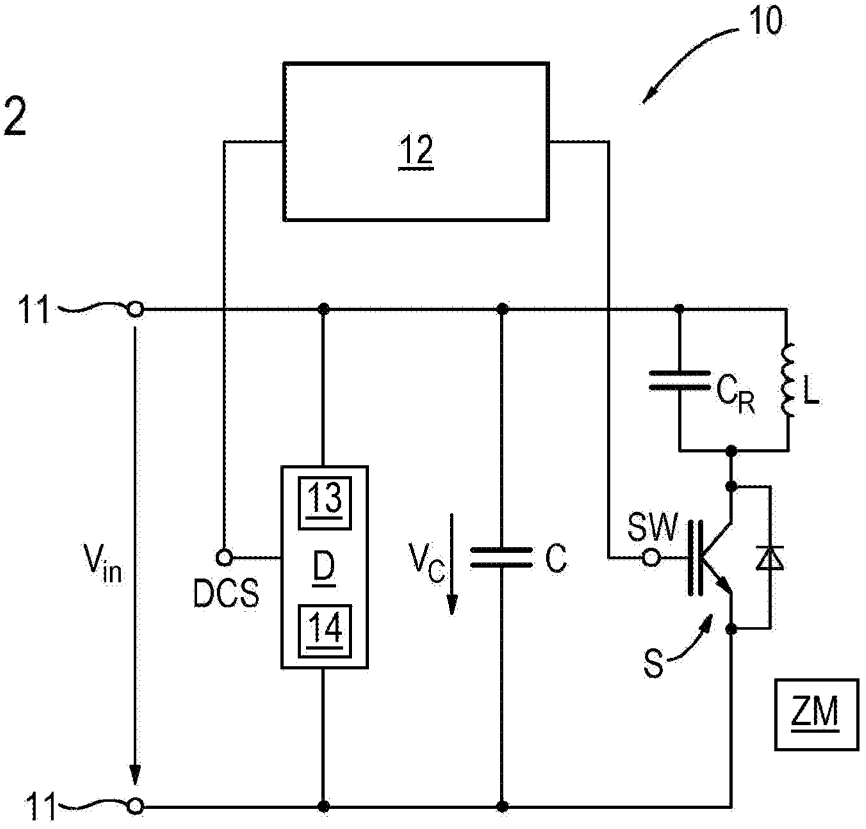
FIG. 2 shows a schematic diagram of a system for controlling the provision of electric power to an induction coil according to an embodiment of the invention.

FIG. 2 shows a schematic diagram of a system for controlling the provision of electric power to an induction coil L, specifically for decreasing switching losses arising at a switching element when operating the heating zone 2 at low power level.

The system comprises a circuitry 10 and a control entity 12 for controlling the operation of the circuitry 10.

The circuitry 10 comprises an input 11 for receiving an input voltage $V_{in}$. The input voltage $V_{in}$ may be a rectified AC-voltage. For example, the rectified AC-voltage may be derived by rectifying a sinusoidal AC-voltage with a certain frequency. The rectified AC-voltage may comprise the double frequency of the sinusoidal AC-voltage. So, for example, if the sinusoidal AC-voltage has a frequency of 50 Hz, the rectified AC-voltage may have a frequency of 100 Hz.

In the embodiments, the AC-voltage can be a sinusoidal AC-voltage having a frequency of 50 Hz, 60 Hz or between 50 Hz and 60 Hz. The rectified AC-voltage correspondingly can be a sequence of essentially positive half sinus waves and/or can have a frequency of 100 Hz to 120 Hz. The rectified AC-voltage can in particular be a sinusoidal AC-voltage which has been rectified by a rectifier, in particular by a bridge rectifier, more in particular by a diode bridge rectifier.

The circuitry 10 further comprises a switching element S. The switching element S is electrically coupled with the induction coil L in order to provide electric power to the induction coil L. The induction coil L is further electrically coupled with a capacitor $C_R$ for creating a resonance circuit. The capacitor $C_R$ may be connected in parallel to the induction coil L. Furthermore, the switching element S may be electrically connected in series to said resonance circuit.

The switching element S is electrically connected with the control entity 12 for receiving a switching signal SW. Based on the switching signal SW, a switching operation of the switching element S can be performed. During said switching operation, pulsed electric power may be provided to the induction coil L which causes an induction heating process. Depending on the electrical dimensioning of the resonance circuit, the switching frequency during switching operation may be in the range of 20 kHz to 30 kHz, specifically 25 kHz.

The circuit 10 further comprises a capacitor C. Said capacitor C is connected in parallel to the switching element S. More in detail, said capacitor C may be connected in parallel to the serial connection of switching element S and resonance circuit. Said capacitor C may be dimensioned such that the voltage $V_c$ across the switching element S can be stabilized at least in a certain time span during the period of input voltage $V_{in}$.

Furthermore, circuit 10 comprises a discharging entity D. Said discharging entity D may be connected in parallel to the capacitor C. Said discharging entity D is configured to time-selectively discharge the capacitor C in order to reduce hard-switching situations and thereby ensuring the operation of the switching element S below a maximum operation temperature.

The discharging entity D may be electrically coupled with said control entity 12 in order to provide a discharging control signal DCS to the discharging entity D. Based on said discharging control signal DCS, a time-selective activation of the discharging entity D can be obtained.

The discharging entity D may, for example, comprise a resistor 13 and a switching element 14 which receives discharging control signal DCS for time-selective activation of said discharging entity D. The switching element 14 may be, for example, a semiconductor switching element, e.g. a transistor etc. According to an embodiment, the switching element S may be used also for activating/deactivating the discharging entity D.

Figure 3:
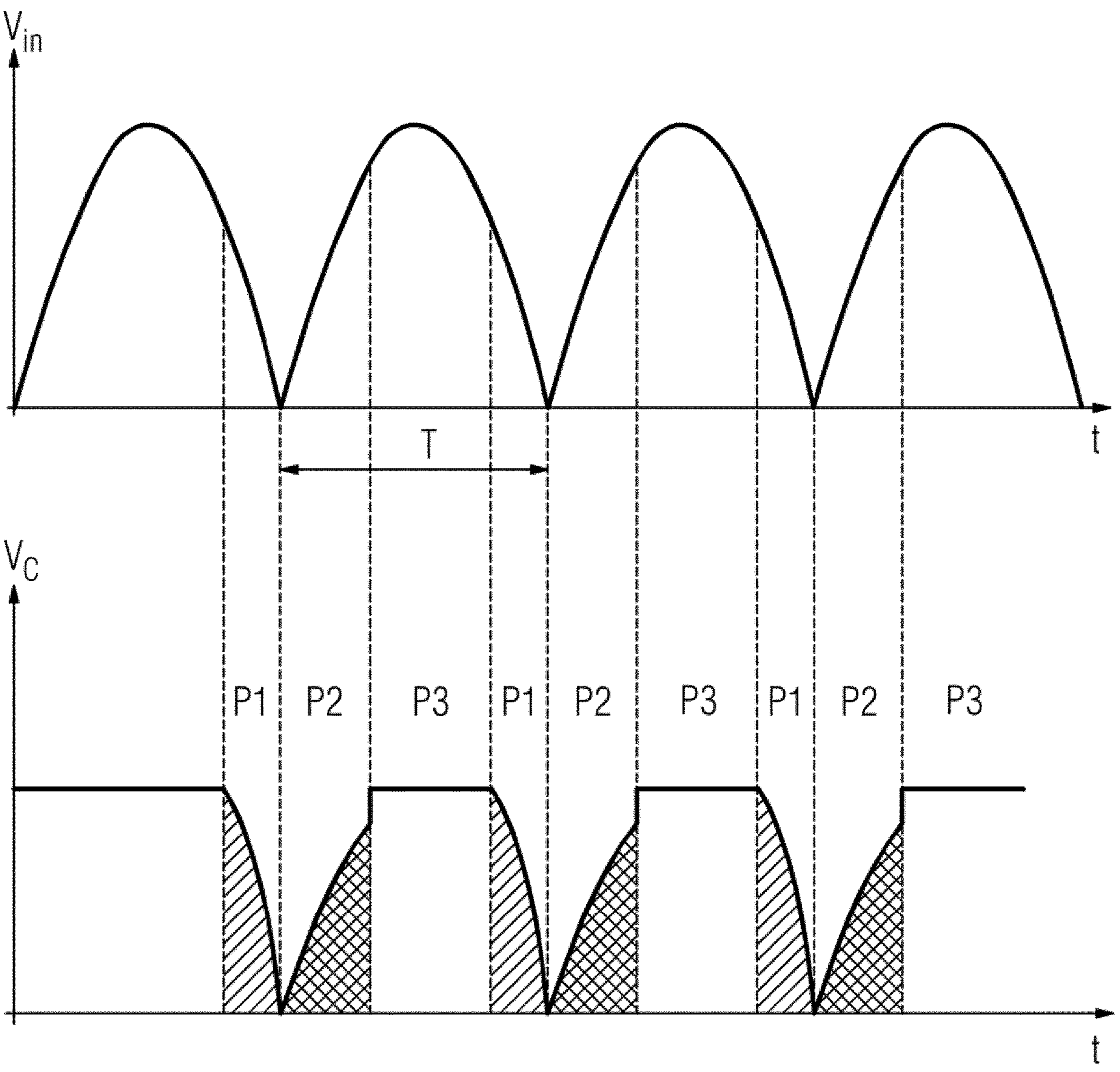
FIG. 3 shows time diagrams of input voltage and capacitor voltage applied to the capacitor.

FIG. 3 shows diagrams of the input voltage $V_{in}$ and the capacitor voltage $V_c$ vs time t. As mentioned before, the input voltage $V_{in}$ may be a rectified sinusoidal AC-voltage. The input voltage $V_{in}$ may comprise a period time T. For controlling the power provision to the induction coil L, three phases may occur during a certain period T of input voltage $V_{in}$.

Before starting the first phase P1, the capacitor voltage $V_c$ may be at a certain value, specifically at a maximum value. In other words, the capacitor C is fully charged. At the beginning of the first phase P1, discharging entity D is activated in order to discharge capacitor C. Said activation may be obtained by a change of voltage level of discharging control signal DCS. For example, said discharging control signal DCS may be switched from low to high or vice versa. The first phase P1 may start during a descending slope of input voltage $V_{in}$. During said discharging of capacitor C, no switching operation may be performed by the switching element S.

After at least partially discharging the capacitor C (e.g. to a voltage of 50V or lower), phase P1 stops and phase P2 is started. Stopping of phase P1 may refer to a change of voltage level of discharging control signal DCS such that discharging obtained by discharging entity D is deactivated. It is worth mentioning that, in preferred embodiments, phases P1 and P2 do not overlap. In phase P2, switching operation of switching element S may be started. The start of phase P2 may coincide or may be close to zero point of input voltage $V_{in}$, wherein "close to zero point" may be defined as an area around zero point which has a time duration of 10% or less, specifically 5% or less than the period T of input voltage $V_{in}$.

During phase P2, a high-frequency switching signal SW is profs to the switching element S. Thereby, oscillations within the resonance circuit are excited which provides electric power to the induction coil L. Phase P2 may be stopped before input voltage $V_{in}$ get zero, specifically at or before input voltage $V_{in}$ reaches its peak value, i.e. during the rising edge of input voltage $V_{in}$.

At the end of phase P2, the provision of high-frequency switching signal SW to the switching element S is stopped. Thereby, the capacitor C can be loaded to its maximum voltage value in phase P3 in which discharging entity D is also deactivated. Afterwards, upper-mentioned cycle including phases P1 to P3 can be performed once again.

The cycle including phases P1 to P3 may be repeated periodically with the periodicity of input voltage $V_{in}$.

In the embodiments, the sequence constituted by a first phase or section P1, a second phase or section P2 and a third phase or section P3 is in particular equal in terms of time to and has the same duration like a single, more in particular phase shifted, period of rectified AC-voltage.

Due to activating the switching element only during a certain portion of the period of input voltage $V_{in}$, it is possible to have, in average, a lower power transfer to the induction coil which reduces to minimum power level. In addition, upper-mentioned discharging of capacitor C before starting switching operation reduces switching losses because due to said discharging of capacitor C, voltage applied to switching element S is reduced.

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS

1 induction cooking appliance
2 heating zone
3 user interface
10 circuitry
11 input
12 control entity
C capacitor
$C_R$ resonance capacitor
D discharging entity
DCS discharging control signal
L induction coil
P1 first phase
P2 second phase
P3 third phase
S switching element SW switching signal $V_c$ capacitor voltage $V_{in}$ input voltage

The invention claimed is:

1. A method for controlling the provision of electric power to an induction coil of an induction cooking appliance, the induction cooking appliance comprising the induction coil and a circuitry that includes a first switching element configured to control a pulsed electric power to the induction coil, and a capacitor connected in parallel with the first switching element, the method comprising the steps of:

receiving a rectified AC-voltage at an input of the circuitry, the rectified AC-voltage having a period that includes a first phase, and then a second phase, and then a third phase, wherein the period of the rectified AC-voltage is periodically repeated;

performing a first circuit control step during the first phase of each of the periods of the rectified AC-voltage, wherein the first circuit control step comprises discharging the capacitor to reduce a voltage of the capacitor from an initial voltage value to a reduced voltage value, wherein said discharging is performed by a first switching operation, during which a discharging circuit and/or the first switching element is gradually changed from a closed state to an opened state;

performing a second circuit control step during the second phase of each the periods of the rectified AC-voltage, wherein the second circuit control step comprises starting a second switching operation that comprises switching the first switching element; and performing a third circuit control step during the third phase of each of the periods of the rectified AC-voltage, wherein the third circuit control step includes stopping the second switching operation, such that the voltage of the capacitor is equal to a final voltage value at the end of the third phase.

2. The method according to claim 1, wherein:

the final voltage value of the capacitor is a maximum voltage of the capacitor, and the pulsed electric power is below a predetermined range.

3. The method according to claim 1, wherein said first phase of the rectified AC-voltage and said first circuit control step begin during a period of time in which a slope of the rectified AC-voltage is falling.

4. The method according to claim 1, wherein the reduced voltage value of the capacitor is 50V or lower.

5. The method according to claim 1, wherein said first circuit control step stops discharging the capacitor at or close to a time when the rectified AC-voltage is at a zero point.

6. The method according to claim 1, wherein the second circuit control step starts the second switching operation at or close to a time when the rectified AC-voltage is at a zero point, and/or when the voltage of the capacitor is 50V or lower.

7. The method according to claim 1, wherein the second switching operation is performed with a switching frequency determined by a first zero crossing detection circuit, and/or wherein the second switching operation is performed with a $T_{on}$ time determined by a voltage of the induction coil and/or the voltage of the capacitor, so that thermal losses of or within the first switching element are kept below a predetermined range.

8. The method according to claim 1, wherein the third circuit control step stops said second switching operation before the rectified AC-voltage reaches its minimum value in the third phase.

9. The method according to claim 1, wherein the third circuit control step stops said second switching operation before the rectified AC-voltage reaches its maximum value in the third phase.

10. The method according to claim 1, wherein an average power loss of the first switching element is below a predetermined maximum power loss, and/or wherein an operation time of the second switching determines the electric power provided to the induction coil and the capacitor, and/or wherein the operation time of the second switching is determined in based on a power level of a heating zone, so that an electric power corresponding to the power level is provided to the induction coil and the capacitor.

11. The method according to claim 1, wherein discharging of the capacitor is not performed simultaneously with the second switching operation.

12. The method according to claim 1, wherein:

during the third phase of the period of the rectified AC-voltage, the capacitor is charged, and/or during the third phase of the period of the rectified AC-voltage, the voltage of the capacitor is at least essentially constant, and/or the third phase of the period of the rectified AC-voltage starts before 40% of the period of the rectified AC-voltage elapses and ends after 60% of the period of the rectified AC-voltage elapses, and/or the third phase of the period of the rectified AC-voltage starts and ends when the rectified AC-voltage is at least 20% below its maximum.

13. The method according to claim 1, wherein:

the first switching element and the induction coil are connected in series with each other between a first node and a second node, the capacitor is connected between the first node and the second node and in parallel with the first switching element and the induction coil, and the discharging circuit comprises a second switching element that is connected between the first node and the second node and in parallel with the capacitor;

the rectified AC-voltage is received between the first node and the second node, wherein the rectified AC-voltage continuously decreases during the entire first phase, continuously increases during the entire second phase, and reaches a maximum value in the third phase;

the first circuit control step operates the second switching element of the discharging circuit according to the first switching operation such that the capacitor is discharged to 50V or less, and a voltage across the first switching element and the induction coil is reduced, wherein discharging of the capacitor ends when the rectified AC-voltage is at a zero point;

the second circuit control step operates the first switching element according to the second switching operation such that electric power being is supplied to the induction coil in accordance with the second switching operation of the first switching element, and the capacitor is charged to a value less than a maximum voltage, wherein operation of the first switching element begins when the rectified AC-voltage is at the zero point;

the third circuit control step charges the capacitor to the maximum voltage and maintains the maximum voltage;

the third phase of the rectified AC-voltage starts before 40% of the period of the rectified AC-voltage elapses and ends after 60% of the period of the rectified AC-voltage elapses, and the third phase of each period of the rectified AC-voltage starts and ends when the rectified AC-voltage is at least 20% below its maximum and discharging the capacitor is not performed simultaneously with operation of the first switching element.

14. The method according to claim 13, wherein:

operation of the first switching element is performed with a switching frequency determined based on a zero point detection of the rectified AC-voltage, operation of the first switching element is performed with an ON time of the first switching element determined by the voltage of the induction coil and/or a voltage of the capacitor, such that thermal losses of or within the first switching element are kept below a predetermined range, and an average power loss of the first switching element is less than a predetermined maximum power loss.

15. The method according to claim 1, wherein during the first switching operation of the first circuit control step that discharges the capacitor, the first switching element is gradually changed from the closed state to the opened state.

16. The method according to claim 1, wherein the final voltage value of the capacitor at the end of the third phase and the initial voltage value of the capacitor at a beginning of the first phase are a maximum voltage value of the capacitor.

17. The method according to claim 1, wherein the final voltage value of the capacitor at the end of the third phase is equal to the initial voltage value of the capacitor at a beginning of the first phase.

18. The method according to claim 1, wherein:

the second circuit control step performs the second switching operation such that the voltage of the capacitor increases from the reduced voltage value to an intermediate voltage value that is between the reduced voltage value and the final voltage value, and the third circuit control step stops the second switching operation such that the voltage of the capacitor increases from the intermediate voltage value to the final voltage value and then is essentially constant until the end of the third phase.

19. The method according to claim 1, wherein the rectified AC-voltage continuously decreases during the entire first phase, continuously increases during the entire second phase, and reaches a maximum value in the third phase.

* * * * *